United States Patent
Dongilli et al.

[11] Patent Number: 5,931,632
[45] Date of Patent: Aug. 3, 1999

[54] SLIDABLE AND REMOVABLE TRUCK BED MULTI-COMPARTMENT SYSTEM

[76] Inventors: Craig Dongilli; Jeanette Dongilli, both of Box 301 Van Meter Rd., Belle Vernon, Pa. 15012

[21] Appl. No.: 09/057,778

[22] Filed: Apr. 9, 1998

[51] Int. Cl.⁶ ........................................ B60P 1/64
[52] U.S. Cl. .................. 414/522; 224/404; 296/37.6
[58] Field of Search ........................... 414/462, 522; 296/37.6; 224/42.33, 281, 402, 403, 404, 542, 543

[56] References Cited

U.S. PATENT DOCUMENTS

| | | | |
|---|---|---|---|
| 3,004,678 | 10/1961 | Golaski | 414/462 |
| 4,303,367 | 12/1981 | Bott | 414/522 |
| 4,305,695 | 12/1981 | Zachrich | 414/522 |
| 4,358,035 | 11/1982 | Heidecker | 414/522 X |
| 4,824,158 | 4/1989 | Peters et al. | 414/522 X |
| 4,841,883 | 6/1989 | Kukovich, Jr. | 414/522 X |
| 5,215,205 | 6/1993 | Behlman | 224/542 X |
| 5,564,767 | 10/1996 | Strepek | 414/522 X |
| 5,597,193 | 1/1997 | Conner | 224/404 X |
| 5,603,439 | 2/1997 | Pineda | 224/281 X |
| 5,685,593 | 11/1997 | O'Conner | 224/404 X |
| 5,762,244 | 6/1998 | Wagner et al. | 224/281 |

*Primary Examiner*—James W. Keenan

[57] ABSTRACT

A rear loader for a truck bed is provided including at least one rail section mounted on a bottom face of a truck bed. At least one compartment section has a bottom face slidably secured to the rail section. At least a pair of faces are coupled to edges of the bottom face and extend upwardly to define an open top for storage of cargo therein.

7 Claims, 3 Drawing Sheets

SLIDABLE AND REMOVABLE TRUCK BED MULTI-COMPARTMENT SYSTEM

BACKGROUND OF THE INVENTION

1. Field of the Invention

The present invention relates to sliding truck beds and more particularly pertains to a new slidable and removable truck bed multi-compartment system for facilitating the loading, unloading and transporting of cargo within a truck bed.

2. Description of the Prior Art

The use of sliding truck beds is known in the prior art. More specifically, sliding truck beds heretofore devised and utilized are known to consist basically of familiar, expected and obvious structural configurations, notwithstanding the myriad of designs encompassed by the crowded prior art which have been developed for the fulfillment of countless objectives and requirements.

Known prior art sliding truck beds include U.S. Pat. Nos. 5,190,337; 5,303,858; U.S. Pat. Des. No. 305,878; U.S. Pat. Nos. 4,635,992; 5,088,636; and 4,522,326.

In these respects, the slidable and removable truck bed multi-compartment system according to the present invention substantially departs from the conventional concepts and designs of the prior art, and in so doing provides an apparatus primarily developed for the purpose of facilitating the loading, unloading and transporting of cargo within a truck bed.

SUMMARY OF THE INVENTION

In view of the foregoing disadvantages inherent in the known types of sliding truck beds now present in the prior art, the present invention provides a new slidable and removable truck bed multi-compartment system construction wherein the same can be utilized for facilitating the loading, unloading and transporting of cargo within a truck bed.

The general purpose of the present invention, which will be described subsequently in greater detail, is to provide a new slidable and removable truck bed multi-compartment system apparatus and method which has many of the advantages of the sliding truck beds mentioned heretofore and many novel features that result in a new slidable and removable truck bed multi-compartment system which is not anticipated, rendered obvious, suggested, or even implied by any of the prior art sliding truck beds, either alone or in any combination thereof.

To attain this, the present invention generally comprises a plurality of rail sections each having a top face with a slot formed therein, as shown in FIG. 3. A bottom face of each rail section is equipped with a plurality of linear aligned apertures for mounting the rail sections to a bottom face of a truck bed. Each rail section has a pair of arcuate side faces defining an interior sleeve and a pair of open ends each defining at least one of a female and male couple. Note FIG. 4. By this structure, a selected amount of the rail sections may be interconnected to define a pair of parallel rails. A rearwardmost pair of the rail sections each has a locking tab pivotally mounted to a bottom face thereof for reasons that will become apparent hereinafter. Also included is a plurality of compartment sections each having a bottom face with a rectangular configuration. Each compartment section has a width equal to that of the truck bed and a length equal to less than ½ that of the truck bed. A pair of side faces are integrally coupled to side edges of the bottom face and extend upwardly therefrom. As shown in FIG. 3, a plurality of ears are mounted to the bottom face of each section for sliding within the track sections. As shown in FIG. 1, the compartment sections include intermediate compartment sections each with a plurality of couples formed on each of a pair of end edges thereof. The compartment sections further include end compartment sections each equipped with a first end edge with a plurality of couples formed thereon. A second end edge of each end compartment section is equipped with an end face integrally coupled thereto and extending upwardly therefrom. During use, the couples of the end edges of the compartment sections are removably secured to each other. Each end face and side face has an inner surface with a plurality of vertical slots formed therein. A plurality of dividers each have a planar rectangular configuration for being slidably situated between an opposed pair of the vertical slots of the compartment sections. Finally, a locking assembly is provided including a locking bar having a pair of arms pivotally coupled to an end face of one of the end compartments. A cross bar is coupled between ends of the arms for being removably connected to the locking tabs of the rail sections. When connected to the locking tabs, the cross bar prevents the compartments from being slidably removed from the truck bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new slidable and removable truck bed multi-compartment system apparatus and method which has many of the advantages of the sliding truck beds mentioned heretofore and many novel features that result in a new slidable and removable truck bed multi-compartment system which is not anticipated, rendered obvious, suggested, or even implied by any of the prior art sliding truck beds, either alone or in any combination thereof.

It is another object of the present invention to provide a new slidable and removable truck bed multi-compartment system which may be easily and efficiently manufactured and marketed.

It is a further object of the present invention to provide a new slidable and removable truck bed multi-compartment system which is of a durable and reliable construction.

An even further object of the present invention is to provide a new slidable and removable truck bed multi-compartment system which is susceptible of a low cost of manufacture with regard to both materials and labor, and which accordingly is then susceptible of low prices of sale to the consuming public, thereby making such slidable and removable truck bed multi-compartment system economically available to the buying public.

Still yet another object of the present invention is to provide a new slidable and removable truck bed multi-compartment system which provides in the apparatuses and methods of the prior art some of the advantages thereof, while simultaneously overcoming some of the disadvantages normally associated therewith.

Still another object of the present invention is to provide a new slidable and removable truck bed multi-compartment system for facilitating the loading, unloading and transporting of cargo within a truck bed.

Even still another object of the present invention is to provide a new slidable and removable truck bed multi-compartment system that includes at least one rail section mounted on a bottom face of a truck bed. At least one compartment section has a bottom face slidably secured to the rail section. At least a pair of faces are coupled to edges of the bottom face and extend upwardly to define an open top for storage of cargo therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
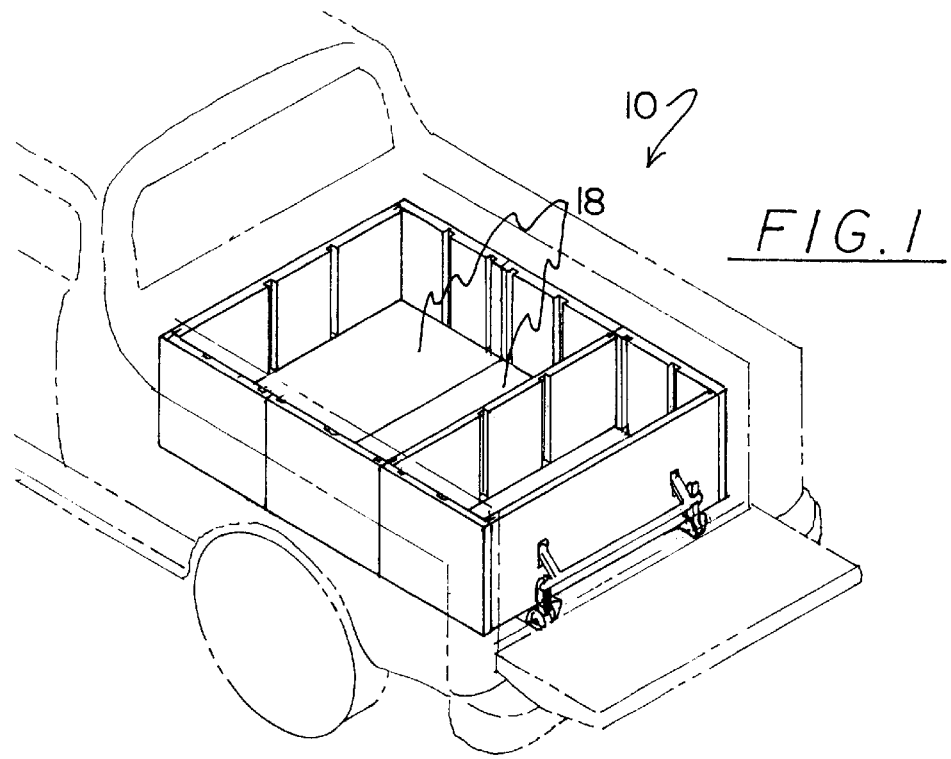
FIG. 1 is a perspective view of a new slidable and removable truck bed multi-compartment system according to the present invention.

With reference now to the drawings, and in particular to FIGS. 1 through 6 thereof, a new slidable and removable truck bed multi-compartment system embodying the principles and concepts of the present invention and generally designated by the reference numeral 10 will be described.

Figure 2:
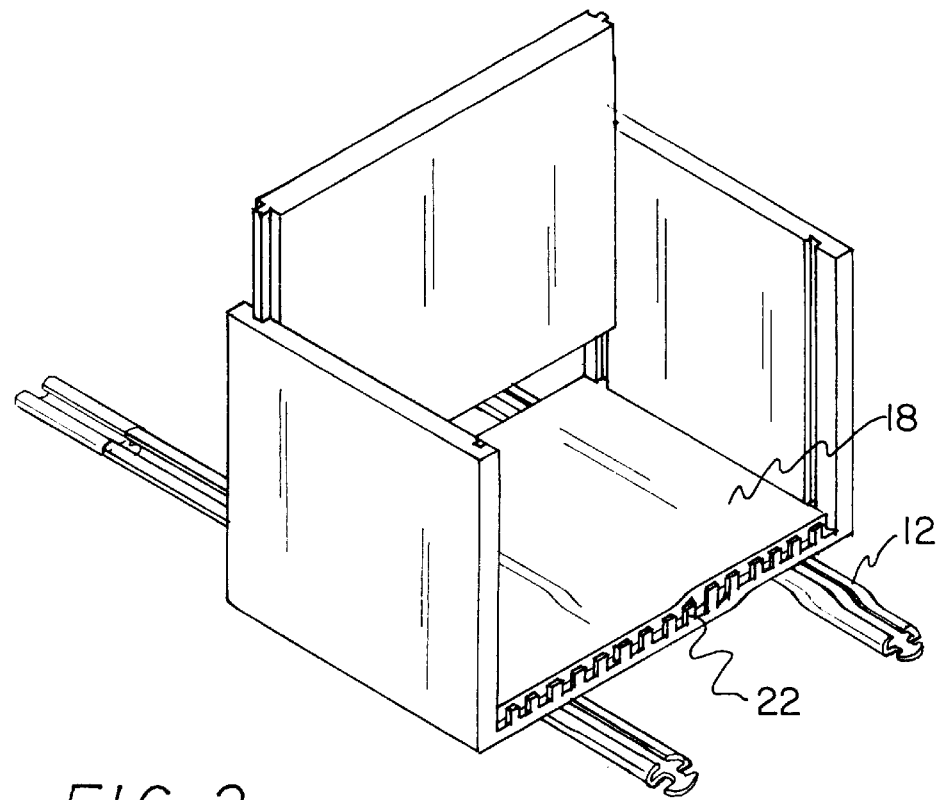
FIG. 2 is a perspective view of the present invention.
Figure 3:
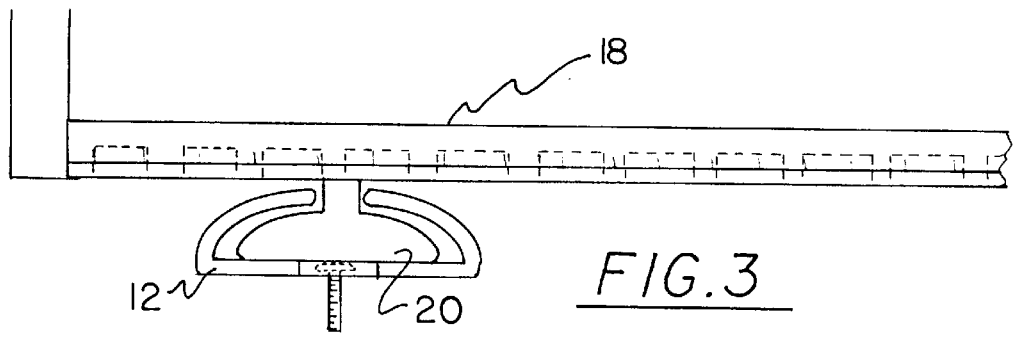
FIG. 3 is an end view of the present invention.
Figure 4:
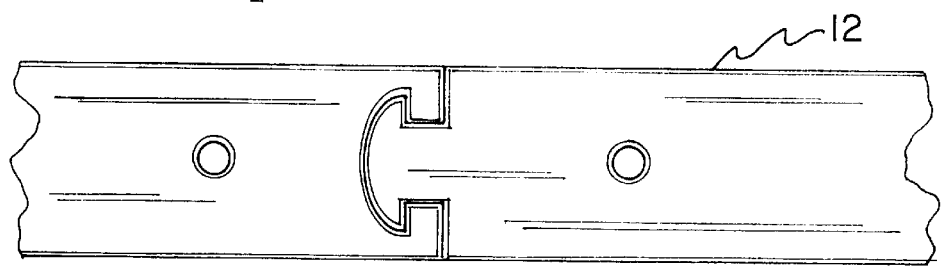
FIG. 4 is a top view of one of the rails of the present invention.

The present invention, designated as numeral 10, includes a plurality of rail sections 12 each having a top face with a slot formed therein, as shown in FIG. 3. A bottom face of each rail section is equipped with a plurality of linear aligned apertures for mounting the rail sections to a bottom face of a truck bed. Each rail section has a pair of arcuate side faces defining an interior sleeve and a pair of open ends each defining at least one of a female and male couple. Note FIG. 4. As shown in FIG. 2, the female and male couples of the ends are formed in the bottom face of the rail sections.

By this structure, a selected amount of the rail sections may be interconnected to define a pair of parallel rails. A rearwardmost pair of the rail sections each has a locking tab 14 pivotally mounted to a bottom face thereof for reasons that will become apparent hereinafter.

Also included is a plurality of compartment sections 18 each having a bottom face with a rectangular configuration. Each compartment section has a width equal to that of the truck bed and a length equal to less than ½ that of the truck bed. A pair of side faces are integrally coupled to side edges of the bottom face and extend upwardly therefrom. As shown in FIG. 3, a plurality of ears 20 are mounted to the bottom face of each section for sliding within the track sections.

Figure 5:
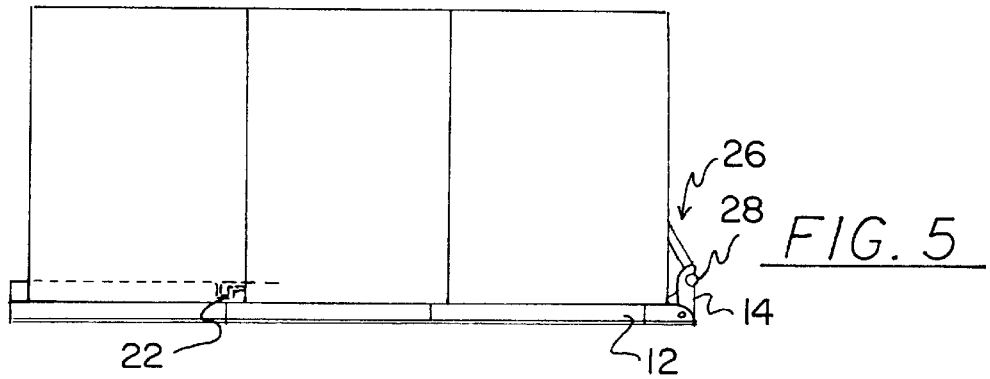
FIG. 5 is a side view of the present invention.
Figure 6:
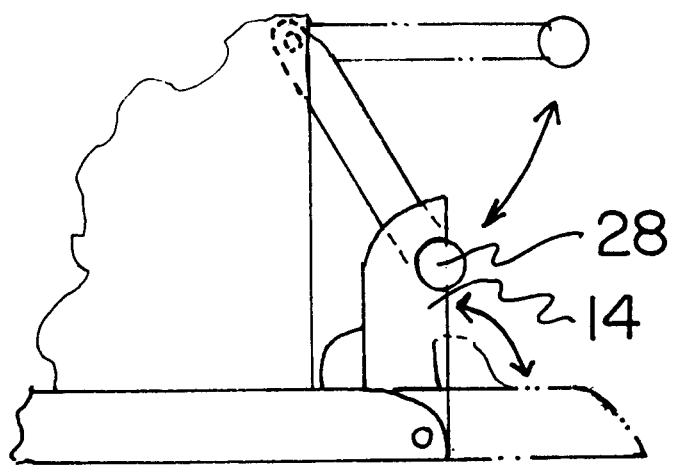
FIG. 6 is a rear side view of the locking assembly of the present invention.

As shown in FIG. 1, the compartment sections include intermediate compartment sections each with a plurality of couples 22 formed on each of a pair of end edges thereof. The compartment sections further include end compartment sections each equipped with a first end edge with a plurality of couples formed thereon. A second end edge of each end compartment section is equipped with an end face integrally coupled thereto and extending upwardly therefrom. In the preferred embodiment, the end and side faces of the compartment sections each are fixedly coupled to the corresponding bottom face and has a height of the side walls of the truck bed. During use, the couples of the end edges of the compartment sections are removably secured to each other. As shown in FIG. 5, this is accomplished by a slot and protrusion coupling.

Each end face and side face of the compartment sections has an inner surface with a plurality of vertical slots formed therein. At least a pair of the vertical slots of each side face are situated adjacent to the end edges of the compartment section. A plurality of dividers each have a planar rectangular configuration for being slidably situated between an opposed pair of the vertical slots of the compartment sections. The dividers are also equipped with vertical slots. As shown in FIG. 1, the dividers may be positioned either laterally or longitudinally between the side and end faces.

Finally, a locking assembly 26 is provided including a locking bar having a pair of arms pivotally coupled to an end face of one of the end compartments. A cross bar 28 is coupled between ends of the arms for being removably connected to the locking tabs of the rail sections. When connected to the locking tabs, the cross bar prevents the compartments from being slidably removed from the truck bed. To accomplish this, the cross bar is snapped or otherwise secured to a slot within each locking tab. As an option, a plurality of lids may be provide for selectively sealing the compartments.

During use, the couples between the compartments may or may not be disengaged and the compartments may be slid rearward separately or as a whole, respectively. Further, each compartment is adapted to be removed from the truck bed for manually transporting cargo.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A rear loader adapted for use with a truck bed, the rear loader comprising, in combination:

a plurality of rail sections each having a top face with a slot formed therein, a bottom face with a plurality of linear aligned apertures for mounting the rail sections to a bottom face of a truck bed, and a pair of arcuate side faces defining an interior sleeve and a pair of open ends each defining at least one of a female and male couple, whereby the rail sections may be interconnected to define a pair of parallel rails, a pair of the rail sections each having a locking tab pivotally mounted to a bottom face thereof;

a plurality of compartment sections each including a bottom face with a rectangular configuration having a width equal to that of the truck bed and a length equal to less than ½ that of the truck bed, a pair of side faces integrally coupled to side edges of the bottom face and extending upwardly therefrom, and a plurality of ears mounted to the bottom face of each section for sliding within the track sections, the compartment sections including intermediate compartment sections each with a plurality of couples formed on each of a pair of end edges thereof and end compartment sections each with a first end edge with a plurality of couples formed thereon and a second end edge with an end face integrally coupled thereto and extending upwardly therefrom and further coupled to the side faces of the corresponding compartment section, wherein the couples of the end edges of the compartment sections are removably secured to each other, each end face and side face having an inner surface with a plurality of vertical slots formed therein;

a plurality of dividers each having a planar rectangular configuration for being slidably situated between an opposed pair of the vertical slots of the compartment sections; and a locking assembly including a locking bar including a pair of arms pivotally coupled to an end face of one of the end compartments and a cross bar coupled between ends of the arms for being removably connected to the locking tabs of the rail sections for preventing the compartments from being slidably removed from the truck bed.

2. A rear loader adapted for use with a truck bed, the rear loader comprising:

at least one rail section adapted for being mounted on a bottom face of the truck bed; and a plurality of compartment sections each having a bottom face slidably secured to the at least one rail section with a pair of side faces coupled to edges of the bottom face of the compartment section and extending upwardly to define an open top for storage of cargo therein, wherein each compartment section has a length that is a fraction of that of the truck bed and edges of the bottom face and the side faces of the compartment sections are removably coupled together such that the side faces remain in coplanar relationship when coupled.

3. A rear loader as set forth in claim 2 wherein the compartment sections include at least one intermediate section with a pair of open end faces and a pair of end sections each of which has a closed end face.

4. A rear loader as set forth in claim 2 wherein the side faces of the compartment sections have inner surfaces with vertical grooves formed therein adjacent to the edges of the bottom face and the side faces to removably receive dividers.

5. A rear loader as set forth in claim 4 wherein the dividers have vertical grooves for receiving subdividers.

6. A rear loader as set forth in claim 2 and further including a locking assembly for precluding the movement of the compartment sections, the locking assembly including a locking bar including a pair of arms pivotally coupled to one of the compartment sections and a cross bar coupled between ends of the arms for being removably connected to locking tabs coupled to the at least one rail section for preventing the compartment sections from being slidably removed from the truck bed.

7. A rear loader as set forth in claim 2 wherein each rail section defines a sleeve and a plurality of ears are coupled to the bottom face of the compartment sections for being slidably situated therein.

\* \* \* \* \*